United States Patent [19]
Reinwall, Jr.

[11] 3,864,790
[45] Feb. 11, 1975

[54] ROPE LOCK DEVICE

[76] Inventor: Ernest William Reinwall, Jr., 3816 W. Idle Dell, McHenry, Ill. 60050

[22] Filed: Mar. 25, 1974

[21] Appl. No.: 454,178

[52] U.S. Cl. .............................. 24/129 R, 24/30.5 R
[51] Int. Cl. ...................... B65d 77/10, F16g 11/00
[58] Field of Search.... 24/71.1, 266, 30.5 R, 243 Q, 24/129 A, 155 BB, 255 C, 249 SA, 129 B, 129 R

[56] References Cited
UNITED STATES PATENTS

| | | | |
|---|---|---|---|
| 77,274 | 4/1868 | Gladding | 24/129 R |
| 86,119 | 1/1869 | Allport | 24/129 R |
| 454,111 | 6/1891 | Coupe | 24/129 B X |
| 814,084 | 3/1906 | Rypinski | 24/155 BB |
| 942,517 | 12/1909 | Reynolds | 24/155 BB |
| 1,070,389 | 8/1913 | Beck | 24/129 B |
| 1,152,892 | 9/1915 | Henry | 24/155 BB |
| 1,784,679 | 12/1930 | Paterson | 24/30.5 R |
| 2,131,162 | 9/1938 | Behnke | 24/129 R |
| 2,741,818 | 4/1956 | Bader | 24/71.1 |
| 2,809,409 | 10/1957 | Rosenbaum | 24/129 B |
| 3,011,236 | 12/1961 | Velia et al. | 24/129 B |
| 3,040,406 | 6/1962 | Artzt | 24/155 BB X |
| 3,043,902 | 7/1962 | Klein | 24/129 R X |
| 3,698,681 | 10/1972 | Lacey | 24/129 R X |

FOREIGN PATENTS OR APPLICATIONS

| 688,260 | 3/1953 | Great Britain | 24/129 A |
|---|---|---|---|

*Primary Examiner*—Donald A. Griffin
*Attorney, Agent, or Firm*—Olson, Trexler, Wolters, Bushnell & Fosse, Ltd.

[57] ABSTRACT

The embodiment of the invention disclosed herein is directed to a rope lock device for receiving a length of relatively small diameter flexible rope and holding the rope against movement. The rope lock device is formed of a molded plastic structure having a yieldable, central support member from which extends a pair of spaced apart arms. Also extending from the central support member, in the opposite direction of said arms, are a pair of spaced apart movable gripping members. Positioned between the movable gripping members is a substantially stationary gripping member. The movable gripping members have aligned apertures therethrough while the stationary gripping member has an aperture which is substantially completely out of registry with the apertures of the movable member when the arms are in their neutral position. Squeezing of the arms will deflect the movable members away from the fixed member and result in placing the apertures substantially in registry with one another so that a rope segment or segments passing through the apertures is easily moved. The plastic structure is molded so that release of the arms causes automatic closure of the rope lock device.

9 Claims, 7 Drawing Figures

PATENTED FEB 11 1975

3,864,790

ROPE LOCK DEVICE

BACKGROUND OF THE INVENTION

This invention relates generally to improvements in the structure of rope lock devices used primarily in conjunction with relatively small diameter rope, and more particularly to rope lock devices that provide substantial useful improvements over existing rope lock devices which are now commonly used in the field of jacket, waistband and hood pull ties as well as laundry bag closures. However, it will be understood that while this invention is directed particularly to devices used for garments and laundry bags, the specific device disclosed herein can be used in other allied fields such as camping, and the like.

Heretofore, rope lock devices used in the field of garments and laundry bags, as well as other allied fields, have been relatively expensive and complicated to manufacture so that they would operate over relatively long periods of time with repeated reliability. Many prior art rope lock devices have been constructed of a multiplicity of separate elements fastened together by such means as welding, brazing or riveting. Furthermore, prior art rope lock devices generally include relatively slidable or moving elements which crimp or compress a rope segment into locking engagement with the interior wall of the rope lock device.

SUMMARY OF THE INVENTION

Accordingly, it is an object of this invention to provide a new and improved rope lock device which is secured against movement without the need of crimping a rope segment against the interior wall of the device.

Another object of this invention is to provide a new and improved rope lock device which is capable of manufacture by plastic molding techniques presently utilized.

Still another object of this invention is to provide an improved rope lock device which is simple and inexpensive to manufacture while providing a high degree of reliability and efficiency in use.

Briefly, the rope lock device of this invention preferably is formed from a single molded unit, which can be injection molded, of a plastic material to have a yieldable, central support member from which extend a pair of spaced apart arms. Also extending from the support member in the opposite direction of the arms are a pair of spaced apart gripping members which have aligned apertures. Positioned intermediate the movable gripping members is a fixed member which also has an aperture formed therein. When the rope lock device is in a neutral position with the arms extending substantially parallel, the apertures in the movable gripping members are substantially entirely out of registry with the aperture within the middle member. A length of flexible rope passing through the apertures, therefore, forms a bight portion and lockingly grips the peripheral edges of the aperture to prevent sliding of the rope therethrough. When the arm members are depressed by squeezing manually between thumb and index finger, the movable gripping members are urged away from one another and arcuately rotate about a central axis so that the apertures therein come in substantial registry with the aperture in the nonmovable member. This allows the flexible rope passing through the apertures to slide easily and allow repositioning of the rope lock device. Therefore, the rope lock device of this invention can be used to provide a tie loop about the opening of a laundry bag. Also, the rope lock device of this invention can be used as an adjusting device for a pull string in garments such as jackets or the like.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a rope lock device constructed in accordance with this invention and is shown in conjunction with a closure tie for the open end of a laundry bag, or the like;

DETAILED DESCRIPTION OF THE ILLUSTRATED EMBODIMENT

Figure 1:
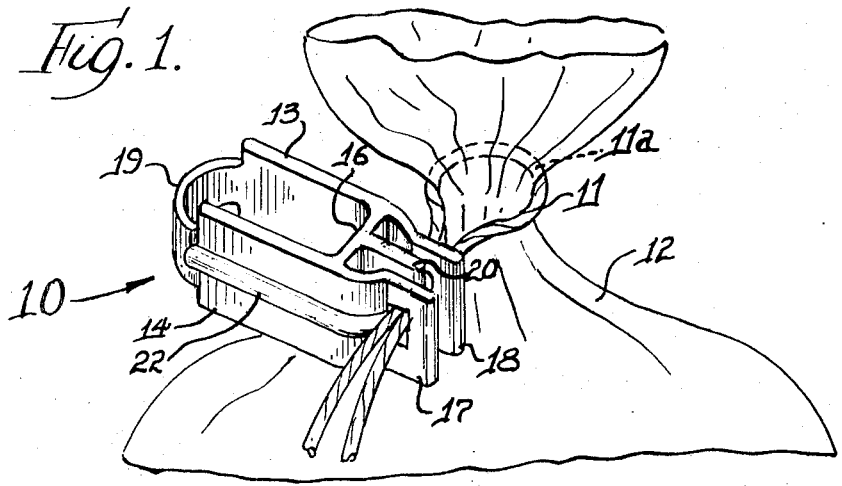

Referring now to FIG. 1 there is seen a rope lock device constructed in accordance with the principles of this invention and designated generally by reference numeral 10. Here the rope lock device 10 is illustrated as being used as a clothes bag tie and includes a length of rope 11 which has a bight portion 11a passing about the opening of a clothes bag 12. The rope lock device 10 holds the rope 11 against movement until a pair of spaced apart arm members 13 and 14 are manually squeezed together. The arm members 13 and 14 will cause a yieldable, central support member 16 to flex somewhat under the squeezing force and open a pair of spaced apart movable gripping members 17 and 18. The arms 13 and 14 are tied together at their ends by a connecting member 19, which may serve to provide a resilient outward force for urging the arms back to their neutral position, as seen in FIGS. 1 and 2.

To provide locking action for the length of rope 11, a nonmovable gripping member 20 is located intermediate the movable members 17 and 18 and which also has an aperture formed therein. However, in the closed position the apertures in movable members 17 and 18 are substantially completely out of registry with the aperture in the nonmovable gripping member 20. To provide improved rigidity of the arm members 13 and 14, stiffener ribs 21 and 22, respectively, are formed therealong.

Figure 2:
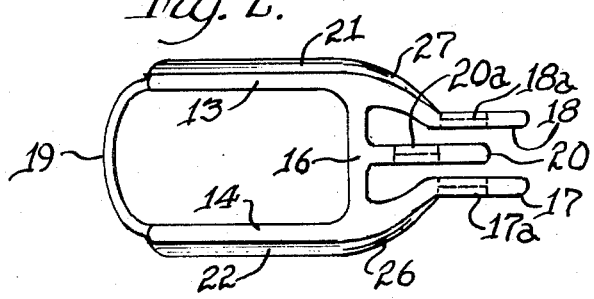
FIG. 2 is a plan view of the rope lock device constructed in accordance with this invention.
Figure 4:
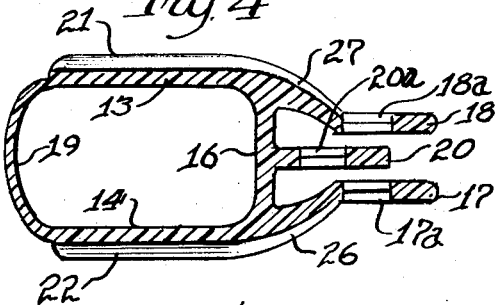
FIG. 4 is a sectional view taken along line 4—4 of FIG. 3 illustrating the reduced dimension portion of the periphery of the apertures passing through the locking members.

As best seen in FIGS. 2 and 4, the movable members 17 and 18 have apertures 17a and 18a, respectively, substantially in alignment with one another while being substantially completely out of registry with an aperture 20a of the fixed gripping member 20. This configuration will form a bight portion 22' within the rope 11, FIGS. 5 and 7, to prevent sliding action of the rope through the apertures. This bight portion firmly engages the peripheral inner edge of the apertures 17a, 18a and 20a so that a more firm gripping action is obtained by the sharp corners provided thereby.

Figure 3:
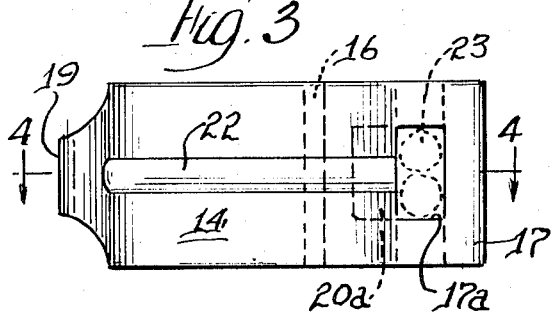
FIG. 3 is a side view of the rope lock device of this invention.

As seen in FIG. 3, the apertures passing through the gripping members preferably are elongated, here being illustrated as rectangular in configuration, it being understood that oval apertures may be utilized, to receive a pair of spaced apart rope elements as indicated by phantom lines 23 of FIG. 3.

Figure 5:
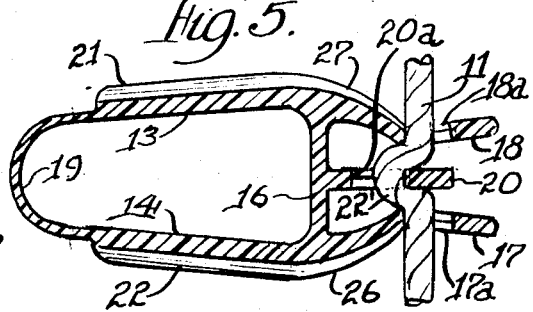
FIG. 5 is a sectional view substantially similar to that of FIG. 4 but illustrates the rope lock device engaging a rope segment for locking the same.
Figure 6:
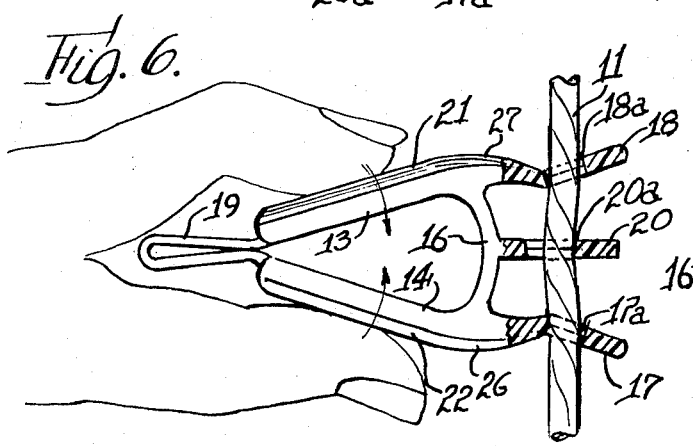
FIG. 6 is a diagrammatic representation illustrating unlocking of the rope lock device to enable a rope segment to be pulled therethrough.
Figure 7:
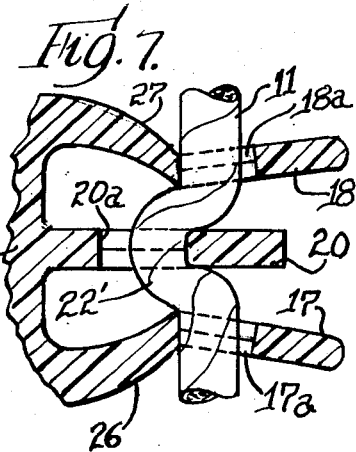
FIG. 7 is an enlarged fragmentary sectional view illustrating more clearly the bight portion of the rope which forms the locking arrangement of the rope lock device.

With the rope lock device of this invention in the position as shown in FIGS. 5 and 7, the rope is restrained from movement through the apertures. However, by pressing together the arms 13 and 14, as seen in FIG. 6, the gripping members 17 and 18 are moved apart relative to one another and away from the fixed member 20. This action will place the apertures 17a and 18a in substantial registry with the aperture 20a. As seen in FIG. 6, squeezing together of the arms 13 and 14 provides straightening of the rope segment captured between the apertures and allows easy sliding of the rope lock device along the length of rope.

While the rope lock device of this invention is here illustrated preferably being constructed of molded plastic, it will be understood that it can be constructed of a unitary member. The arms 13 and 14 preferably are spaced apart and parallel to one another while the gripping portions 17 and 18 are also parallel to one another but are connected to the yieldable, central support member 16 by arcuate segments 26 and 27, respectively. The arcuate portions 26 and 27 also provide means for diminishing the overall thickness of the arms from the yieldable portion 16 to the ends of the gripping portions 17 and 18.

While the rope lock device 10 illustrates a connecting member 19 between the ends of the arms 13 and 14, it will be understood that such connecting member may be eliminated, if desired.

While a single specific embodiment of the rope lock device of this invention has been illustrated herein, it will be understood that a multitude of variations and modifications may be effected without departing from the spirit and scope of the novel concepts disclosed and claimed herein.

The invention is claimed as follows:

1. In a rope lock device for receiving a length of flexible rope and holding the rope against movement until selectively released therefrom, the combination comprising: a yieldable, central support member, a pair of spaced apart arm means secured to said yieldable, central support member and extending therefrom in a first direction selectively to be pressed together from a neutral position for bending of said yieldable, central support member, first and second spaced apart, movable gripping members secured to said yieldable, central support member and extending therefrom in a second direction, said first and second gripping members having aligned apertures formed therethrough of a size to receive at least one length of a rope of given diameter, said first and second spaced apart gripping members being movable away from and toward one another upon pressing and releasing, respectively, of said arm means, and a third gripping member secured to said yieldable, central support member to be positioned between said first and second spaced apart movable gripping members, said third gripping member having an aperture therethrough which is substantially completely out of registry with the apertures through said first and second gripping members when said pair of arms are in their neutral position for forming a bight portion of the rope segment passing through said apertures of said first, second and third gripping means to lock the rope in place, the apertures of said first, second and third gripping members being placed in substantial registry with one another when said arm means are pressed together, thereby removing said bight portion from said rope segment for releasing the rope for free movement through said first, second and third gripping members.

2. In the rope lock device as set forth in claim 1 wherein said yieldable, central support member, said pair of spaced apart arm means, said first, second and third gripping members are formed as an integral unit of molded plastic material.

3. In the rope lock device as set forth in claim 1 wherein said pair of spaced apart arm means are substantially parallel to one another in their neutral position and wherein said first and second gripping members are diverging slightly outward from said central support member when forming said bight portion within the rope segment for locking the rope against movement.

4. In the rope lock device as set forth in claim 3 wherein said first and second gripping members are spaced apart a distance less than the distance between said pair of spaced apart arm means.

5. In the rope lock device as set forth in claim 1 further including a flexible connecting member extending between free ends of said pair of spaced apart arm means and secured thereto to be compressibly deformed when said arm means are pressed together for releasing the bight portion formed within the rope segment passing through said first, second and third gripping members.

6. In the rope lock device as set forth in claim 5 wherein said flexible connecting member is formed as an integral part with the terminating ends of said arm means and serves to provide outward bias to the arm means for maintaining the arms in their neutral position.

7. In the rope lock device as set forth in claim 1 wherein said first, second and third gripping members are formed of material having a predetermined thickness, the area immediately adjacent the periphery of the apertures through said first, second and third gripping members being less than said predetermined thickness.

8. In the rope lock device as set forth in claim 1 wherein the apertures passing through said first, second and third gripping members are elongated and have a longitudinal extent of about twice that of said given diameter of said rope to receive the lengths of said rope.

9. In the rope lock device as set forth in claim 1 further including stiffener rib means formed along each of said pair of spaced apart arms to reduce flexure of the arms thereby insuring flexure of said yieldable, central support member during pressing of said arms together.

* * * * *